(12) United States Patent
Löf et al.

(10) Patent No.: US 7,931,426 B2
(45) Date of Patent: Apr. 26, 2011

(54) CUTTING INSERT FOR CHIP REMOVING MACHINING OF WORKPIECES

(75) Inventors: Ronnie Löf, Sandviken (SE); Jörgen Wiman, Sandviken (SE); Ulrik Sunnvius, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 401 days.

(21) Appl. No.: 12/155,086

(22) Filed: May 29, 2008

(65) Prior Publication Data
US 2009/0060665 A1    Mar. 5, 2009

(30) Foreign Application Priority Data

Aug. 31, 2007 (SE) ...................................... 0701966

(51) Int. Cl.
B23C 5/00 (2006.01)
B23C 5/02 (2006.01)

(52) U.S. Cl. ...................................... 407/113; 407/115
(58) Field of Classification Search .......... 407/113–116, 407/100, 103
See application file for complete search history.

(56) References Cited

U.S. PATENT DOCUMENTS

| 5,011,340 | A | * | 4/1991 | Pettersson et al. | 407/114 |
| 5,226,761 | A | | 7/1993 | Satran et al. | |
| 6,217,263 | B1 | | 4/2001 | Wiman et al. | |
| 7,458,753 | B1 | * | 12/2008 | Niebauer et al. | 407/113 |
| 7,513,717 | B2 | * | 4/2009 | Engstrom et al. | 407/113 |
| 2002/0134206 | A1 | | 9/2002 | Schroeder | |
| 2009/0285646 | A1 | * | 11/2009 | Oprasic et al. | 407/114 |

FOREIGN PATENT DOCUMENTS

| EP | 0 054 481 | 6/1982 |
| EP | 1 297 921 | 4/2003 |
| SE | 509 224 | 12/1998 |
| SE | 512 253 | 2/2000 |
| SU | 1782196 | 12/1992 |
| WO | WO 95/00272 | 1/1995 |
| WO | WO 01/78926 A1 | 10/2001 |

* cited by examiner

*Primary Examiner* — Will Fridie, Jr.
(74) *Attorney, Agent, or Firm* — Drinker Biddle & Reath LLP (57) ABSTRACT

A cutting insert for chip removing machining of workpieces, including at least one chip-removal surface that carries away chips, at least one side surface that is a clearance surface, and at least one cutting edge formed between the at least one chip-removal surface and the at least one side surface. The cutting edge includes a main-edge segment that carries out a major part of a chip-removing operation, and a wiping-edge segment that, in the chip-removing operation, wipes off and levels a machined surface of the workpiece. The wiping-edge segment forms a depression.

19 Claims, 10 Drawing Sheets

CUTTING INSERT FOR CHIP REMOVING MACHINING OF WORKPIECES

This application claims priority under 35 U.S.C. §119 to Swedish Patent Application No. 0701966-4, filed on Aug. 31, 2007, which is incorporated by reference herein in its entirety.

FIELD OF THE INVENTION

The present invention relates generally to a cutting insert for chip removing machining of workpieces, having at least one chip-removal surface arranged to carry away chips, at least one side surface arranged to serve as a clearance surface, and at least one cutting edge, formed between one of the chip-removal surfaces and one of the side surfaces. The cutting edge includes at least one main-edge segment to carry out the major part of a chip-removing operation, and at least one wiping-edge segment to, in the chip-removing operation, wipe off and level the machined surface of the workpiece.

BACKGROUND OF THE INVENTION

A cutting insert of the kind in question is a replaceable wear part for detachable mounting in a holder, which may have a number of alternative shapes, and may be used industrially for most varying purposes, such as milling, drilling, reaming, turning and the like. The workpieces machined are usually made of metal, the cutting inserts being manufactured from a hard, wear-resistant material, such as cemented carbide, silicon nitride, aluminum oxide, etc., while the insert holders are manufactured from a more elastic material, in particular steel.

The cutting insert may have two opposite, first and second surfaces, at least one of which forms a chip-removal surface. The chip-removal surface is a surface over at least a part of which a chip can slide when using the cutting insert. The chip-removal surface may be a so-called cutting-geometry surface having a particular, topographic design with a purpose of, in a way known per se in the art, carrying away and breaking off chips formed in the machining of the workpiece. One or more side surfaces extend between the first and second surfaces. In case that only the first surface is a chip-removal surface (a so-called single-sided cutting insert), the second surface is only an abutment surface for support against the holder, and in case both the first and the second surface are a chip-removal surface (a so-called double-sided cutting insert), both the first and the second surface may at least partly serve also as an abutment surface.

As seen with the chip-removal surface facing the observer, the cutting insert may have alternative shapes, e.g., a round, in particular a circular or oval shape, or a polygonal shape. In a polygonal shape, the cutting insert has a side surface having at least three usually plane or slightly arched main portions, here denominated main-surface portions, wherein adjacent main-surface portions transform into each other via a convexly rounded nose, here also denominated transition-surface portion, to which at least one cutting edge connects, formed between the chip-removal surface and the transition-surface portion. Such a cutting edge may be said to have a main-edge segment that, in use, carries out the major part of the chip-removing operation. Via at least one portion of the nose, the main-edge segment extends to a surface-wiping edge segment, in this description also called wiping-edge segment, that, in use, wipes off and levels the machined surface of the workpiece. The wiping-edge segment extends to an additional segment that is arranged to clear at a certain clearance angle from a machined surface of the workpiece. In polygonal cutting inserts, such a wiping-edge segment may be present on one side of the proper nose (asymmetrical nose) or on both sides of the nose (symmetrical nose).

The surface finish of the rotating workpiece is affected by the interaction between the design of the cutting edge and the feed. In this respect, the wiping-edge segment is particularly important. In previously known turning inserts (see, for instance, International Patent Application Publication No. WO95/00272, U.S. Pat. Nos. 6,217,263, 5,226,761, Swedish Patent No. 9401732-4, Swedish Patent No. 9702501-9 and SU1782196), the wiping-edge segment is usually arched, and the length thereof is essentially as great as the feed. A tangential point is defined by the point of the cutting edge that in use is closest to the rotation axis of the workpiece. A troublesome circumstance for the surface finish in previously known cutting inserts is that the location of the actual tangential point along the wiping-edge segment has not been able to be predetermined. Thus, the true tangential point may "drift" in a uncontrollable way between the two opposite ends of the wiping-edge segment, depending on the alignment of the cutting insert in relation to the workpiece, and in this connection give rise to varying surface finish.

European Patent No. 1297921A presents a cutting insert that solves the problem of the "drifting" of the tangential point and that affords a considerably better control of the surface finish. However, even if European Patent No. 1297921A has achieved an improvement in cutting inserts of the kind in question, there remains a need for further improving the surface finish.

In addition, there is a need in known cutting inserts for decreasing cutting forces and vibrations, as well as increasing the service life of the cutting insert.

An object of the invention is to provide a cutting insert that generally ensures improved surface finish of the machined surface of a workpiece. In its materialization in the form of turning inserts, it should be possible to utilize this possibility, for instance for radically increased feed with retained or even improved surface finish, and alternatively improved surface finish at unaltered feed.

Additional objects of the invention are to decrease cutting forces, to decrease vibrations, as well as to increase the service life of the cutting insert.

The invention may be used for general increase of the performance of cutting inserts provided with wiping-edge segments but intended for other machining techniques than turning, such as milling, drilling, reaming or the like.

SUMMARY OF THE INVENTION

In an embodiment, the invention provides a cutting insert for chip removing machining of workpieces, including at least one chip-removal surface that carries away chips, at least one side surface that is a clearance surface, and at least one cutting edge formed between the at least one chip-removal surface and the at least one side surface. The cutting edge includes a main-edge segment that carries out a major part of a chip-removing operation, and a wiping-edge segment that, in the chip-removing operation, wipes off and levels a machined surface of the workpiece. The wiping-edge segment forms a depression.

As is explained in more detail below, the wiping-edge segment provides a "double" wiping operation, whereby a considerably improved surface finish of the machined workpiece is attained. Such as also is explained in more detail below, in the cutting inserts formed according to the invention, there occur intervals of the feed where the surface irregularity of the machined surface is substantially constant. This allows a considerable improvement in the cutting performance in comparison with prior art cutting inserts where the surface irregularity increases continuously with the feed.

In addition, the invention results in the surface finish becoming less susceptible to misalignments of the cutting insert in relation to the feeding direction. This is due to, as is explained in more detail below, the tangential point moving considerably less, upon such a misalignment, than in known cutting inserts.

In addition, studies have indicated that the invention, at least in certain applications, decreases the cutting forces.

Preferably, the depression is primarily orientated in a plane parallel to a principal extension area of the chip-removal surface at which the depression is formed. Thus, the depression is orientated in such a way that it appears in an orientation of the cutting insert such that the chip-removal surface, at which the wiping-edge segment is formed, is facing the observer.

Preferably, the greatest depth of the depression is at least 0.2% of the length of the wiping-edge segment. Thereby, a size of the depression is obtained that additionally ensures improvements of the surface finish and the decreased sensitivity to misalignments of the cutting insert.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
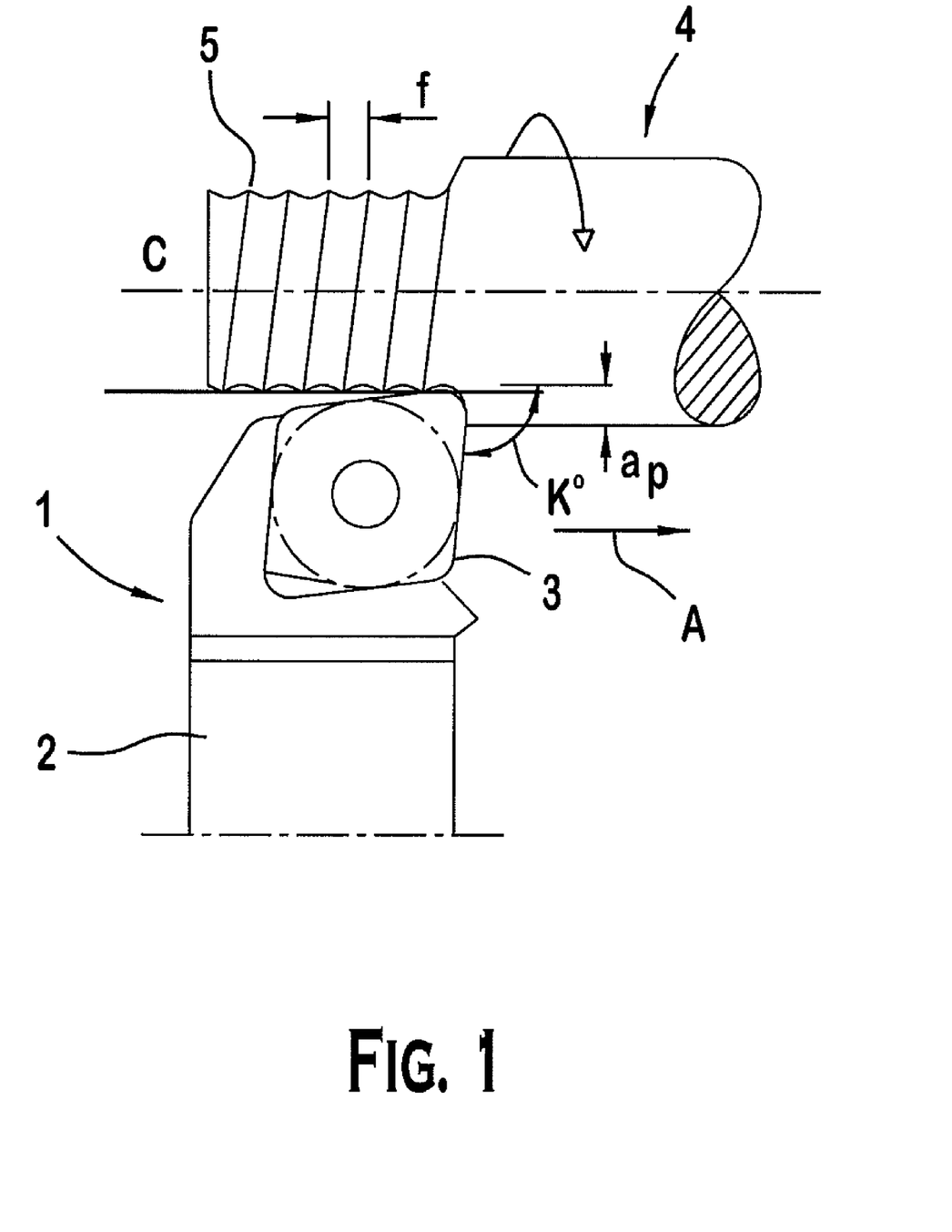
FIG. 1 is a schematic illustration of the general principle of longitudinal turning.

FIG. 1 schematically shows a turning tool 1 during machining of a workpiece. In this case, the machining is longitudinal turning. The tool 1 includes a holder 2 in the form of a bar, and a replaceable cutting insert 3. The workpiece 4 is rotatable around an axis C. A machined, cylindrical surface 5 of the workpiece is shown with considerably exaggerated wave formations. The distance between the crests of the wave formations corresponds to the feed f of the cutting insert 3. Furthermore, $a_p$ designates the cutting depth that is the radius difference between the machined surface 5 and the unmachined surface 6 as measured perpendicularly to the feeding direction A of the tool.

Figure 2:
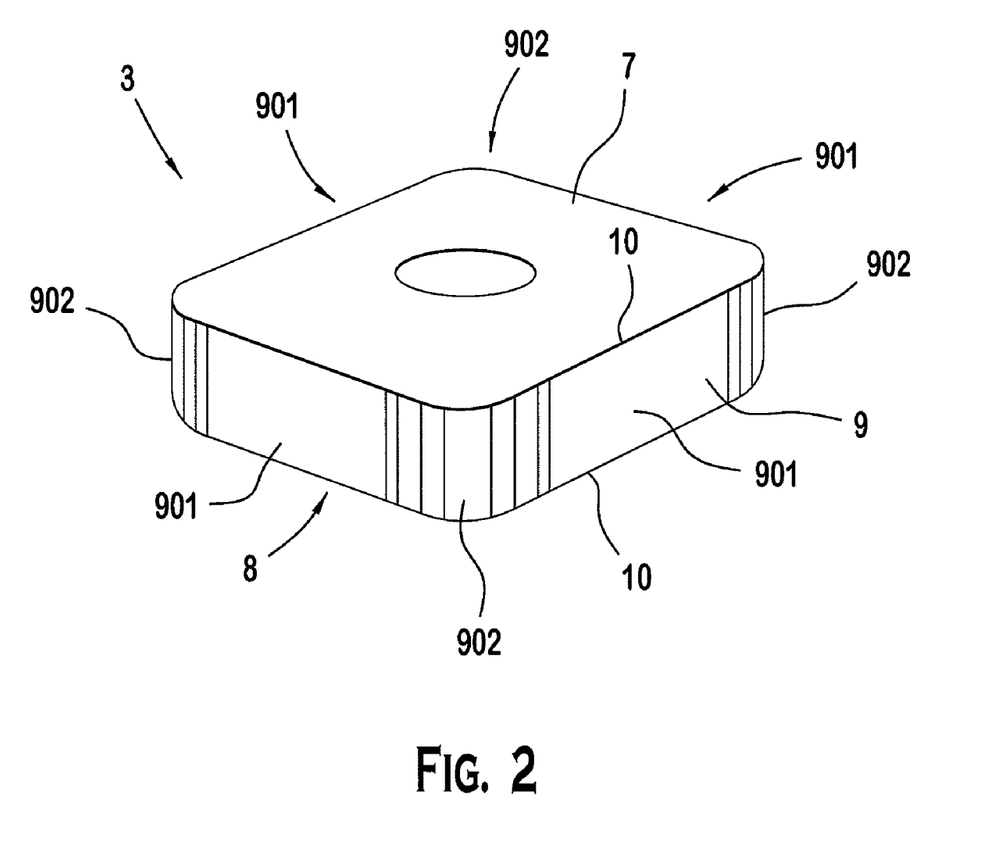
FIG. 2 is a perspective view of a polygonal, particularly quadrangular cutting insert according to one embodiment of the invention.

Reference is now made to FIG. 2, which illustrates a cutting insert 3 according to one embodiment of the invention. In this case, the cutting insert is in the form of a body having a polygonal, more precisely principally rhombic basic shape, which is delimited by two opposite, first and second surfaces 7, 8, and a side surface 9 that extends around the entire cutting insert 3. The cutting insert may have a number of alternative basic shapes, e.g., a triangular or round shape. The side surface 9, which is arranged to partly serve as a clearance surface in the machining, includes four principally straight main-surface portions 901, as well as transition-surface portions 902, each one of which connects two main-surface portions 901. In FIG. 1, a so-called setting angle K° is shown, which is the angle between a cutting-edge segment at one of the main-surface portions 901, usually denominated the main cutting edge of the cutting insert, and the feeding direction A.

In this embodiment, the cutting insert is double-sided, i.e., both the first and the second surface 7, 8 are chip-removal surfaces. A chip-removal surface is a so-called cutting-geometry surface having a particular, topographic design with a purpose of, in a way known per se in the art, carrying away and breaking off chips formed in the machining of the workpiece. In the operative state of the cutting insert, i.e., during turning, the surface facing away from the holder 2 forms an active chip-removing surface, while the surface facing the holder 2 is inactive. In embodiments where the cutting insert is single-sided, the surface facing the holder 2 may serve only as a support surface, for instance having a substantially plane shape.

Between each one of the chip-removal surfaces 7, 8 and the side surface 9, a continuous cutting edge 10 is formed, which adjacent to each one of the transition-surface portions 902, is divided into a plurality of segments, as is described in more detail below. The segments of the respective cutting edge 10 are provided by a suitable forming of the transition-surface portions 902 of the side surface 9 in such a way that these are divided into part surfaces having different radii of curvature, as is shown by vertical lines in FIG. 2. The forming of the part surfaces may be effected by grinding, direct pressing, injection moulding or in other suitable ways.

As an alternative to a continuous cutting edge 10, a plurality of non-continuous cutting edges 10 may be distributed in suitable positions along the periphery of a chip-removal surface 7, 8.

Figure 3:
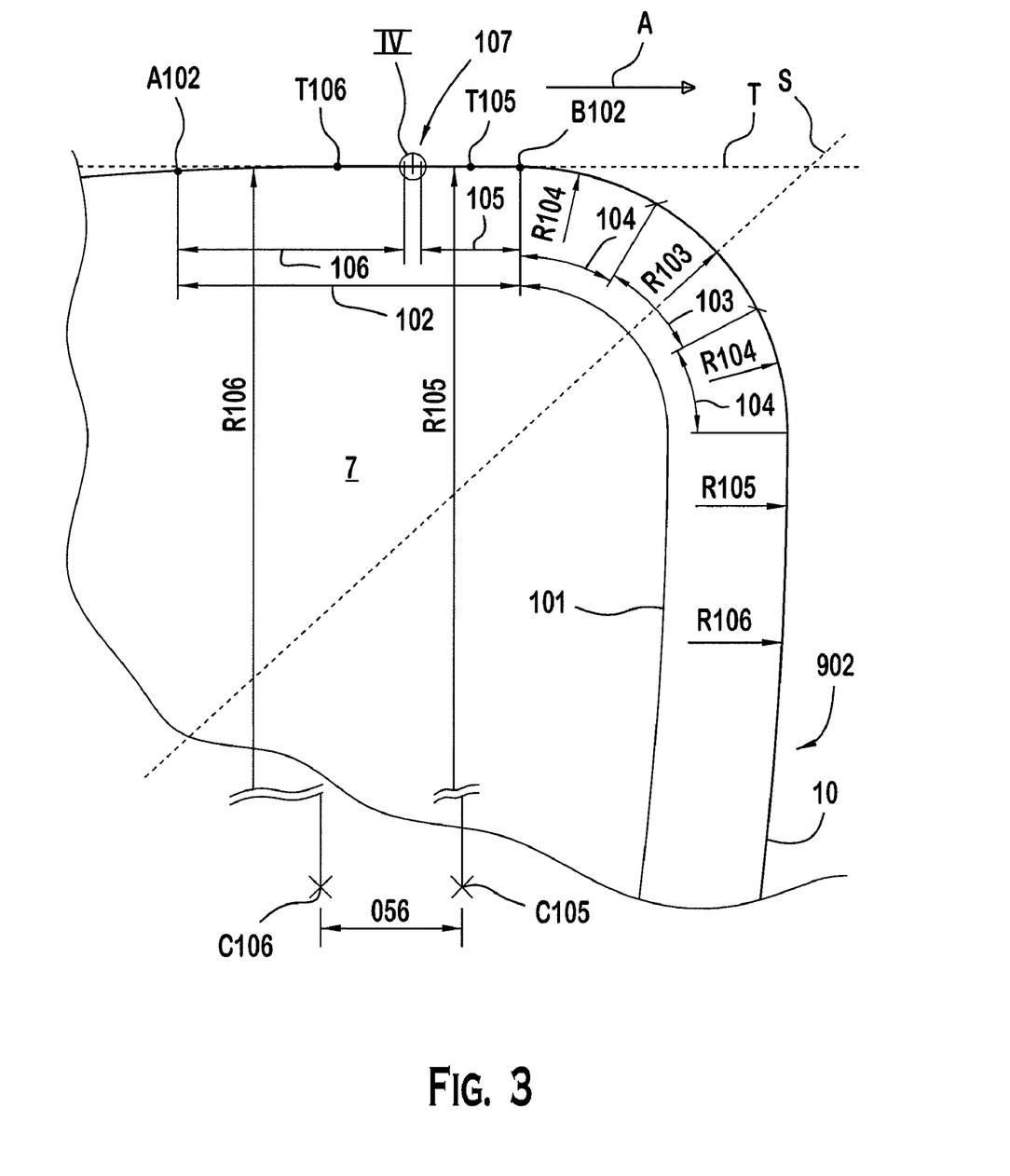
FIG. 3 is an enlarged, partial view from above of the cutting insert in FIG. 2, with a portion of a cutting edge of the cutting insert.

In FIG. 3, a portion of the cutting insert in FIG. 2 is shown with one of the chip-removal surfaces 7 facing the observer. More precisely, in FIG. 2, a portion of the cutting insert at a part of a cutting edge 10 is shown, which is formed at one of the transition-surface portions 902 of the side surface. Dimensions and mutual positions of parts shown in the figure are not exact or necessarily drawn to scale, but are presented to give an understanding of significant properties of the embodiment in question. In this embodiment, the cutting insert is formed so that different edge segments on both sides of a symmetry line or bisector (indicated by a broken line S in FIG. 3) have identical shape. Here, the bisector S is defined such that it divides the angle between the main-surface portions 901 (FIG. 2) that connect to the transition-surface portion 902 shown in FIG. 3 into two equal parts.

In this example, the cutting insert is mounted so that it is fed in the direction indicated by arrow A in FIG. 3. In that connection, the cutting edge 10 has a main-edge segment, the extension of which is partly indicated in FIG. 3 by an arrow 101, which in use carries out the major part of the chip-removing operation. The main-edge segment 101, such as it is defined herein, extends over the bisector S. Immediately next to the main-edge segment 101, the cutting edge 10 has a wiping-edge segment 102, the extension of which is indicated in FIG. 3 by a double arrow 102, which in use wipes off and levels the machined surface of the workpiece. The wiping-edge segment 102 has a principal extension from one end of the main-edge segment 101 in a direction opposite the feeding direction A. The extension of the wiping-edge segment 102 is described in more detail below, but here it may be mentioned that the length thereof preferably is not greater than the highest feed f (FIG. 1) upon a use that the cutting insert 3 is intended for. As an example of usually occurring feed intervals for cutting inserts for turning, 0.3-0.65 mm/r for relatively small cutting inserts, and 0.5-2 mm/r for relatively large cutting inserts may be mentioned.

Since the edge segments on both sides of the bisector S have identical shape, the cutting insert may, by another mounting, be used in a mirrored way, wherein a part of it, which in FIG. 3 is indicated as main-edge segment 101, may be a wiping-edge segment, and the one indicated as wiping-edge segment 102 in FIG. 3 may be a part of a main-edge segment. Such a mirrored way of use may also occur without change of the mounting of the cutting insert, for instance upon feed in the radial direction (e.g., upward in FIG. 1). Alternatively, at the transition-surface portions 902, the cutting insert may be non-symmetrical around the bisector S.

The main-edge segment 101 includes a convex tip segment, the extension of which is indicated in FIG. 3 by a double arrow 103, and which extends on both sides of the bisector S and intersects the same. The tip segment 103 has a radius of curvature R103 that in this example is 0.8 mm. Immediately next to the tip segment 103 and on both sides of the same, the cutting edge 10 has a respective convex transition segment, the respective extension of which is indicated in FIG. 3 by a double arrow 104. The transition segments 104 have a radius of curvature R104 that in this example is 0.6 mm.

The design of the segment or segments of the cutting edge 10 that, in the intended feeding direction A, are found in front of the wiping-edge segment 102, may naturally be varied within the scope of the invention. For instance, the radius of curvature R103 of the tip segment 103, as well as the radii of curvature R104 of the transition segments 104 may have other values than in the example in FIG. 3, and the radii generally assume any suitable values. As an example, the radius of curvature R103 of the tip segment 103 may be within the interval of 0.3-3.2 mm, and the radii of curvature R104 of the transition segments 104 may be within the interval of 0.1-2 mm. Furthermore, the radius of curvature R103 of the tip segment 103 should be greater than the radii of curvature R104 of the transition segments 104, but this relation may naturally be the opposite. Alternatively, the cutting edge 10 may have a constant radius forward in the intended feeding direction A from the wiping-edge segment 102 and past the bisector S. As an additional alternative, the part of the cutting edge 10 that, in the embodiment described here, is formed of the tip segment 103 and the transition segments 104 may include more than three segments, those of the segments that are adjacent having different radii of curvature.

The wiping-edge segment 102 has first and a second convex segment parts, the respective extensions of which are indicated in FIG. 3 by a double arrow 105, 106. In this example, the first and second convex segment parts 105, 106 have constant radii of curvature R105, R106, both of which are 5 mm.

The first and the second convex segment parts 105, 106 may have radii of curvature R105, R106 that mutually are of different size. In that connection, preferably the first convex segment part 105, i.e., the convex segment part situated in front as seen parallel to the feeding direction A, has a greater radius of curvature R105 than the second convex segment part 106.

Thus, the first and the second convex segment parts 105, 106 have a first and a second, respectively, center of curvature C105, C106 corresponding to their respective radii of curvature R105, R106. The centers of curvature C105, C106 are situated separated from each other and in the same order, as seen parallel to the intended feeding direction A, as the first and the second convex segment parts 105, 106. The distance in a direction parallel to the feeding direction A between the first and the second centers of curvature C105, C106, in this description denominated the projected center distance, is indicated by a double arrow O56 in FIG. 3. An imaginary straight tangent line T (indicated by a broken line in FIG. 3) is tangent to the first and the second convex segment parts 105, 106 at first and second, respectively, vertex points T105, T106. In use, the cutting insert is mounted so that the tangent line T is parallel to the feeding direction A. Thus, the projected center distance O56 is the distance between the first and the second centers of curvature C105, C106 in a direction parallel to the tangent line T.

As is shown in FIG. 3, the wiping-edge segment 102 between the first and the second vertex point T105, T106 has a depression 107. In this embodiment, the depression 107 is principally orientated in the plane of the drawing (FIG. 3), i.e., in a plane parallel to a principal extension area of the chip-removal surface 7 at which the depression 107 is formed. Thus, the depression 107 is a field, or an area, that is inside the tangent line T, and between the first and the second, respectively, convex segment parts 105, 106. More precisely, the depression 107 is formed of a field, or an area, that is limited by the tangent line T, and the cutting edge 10 between the first and the second vertex points T105, T106. In this embodiment, the greatest depth of the depression, i.e., the greatest distance from the tangent line T to the cutting edge 10, is approx. 0.004 mm. More generally, the greatest depth should not be less than 0.002 mm.

Figure 4:
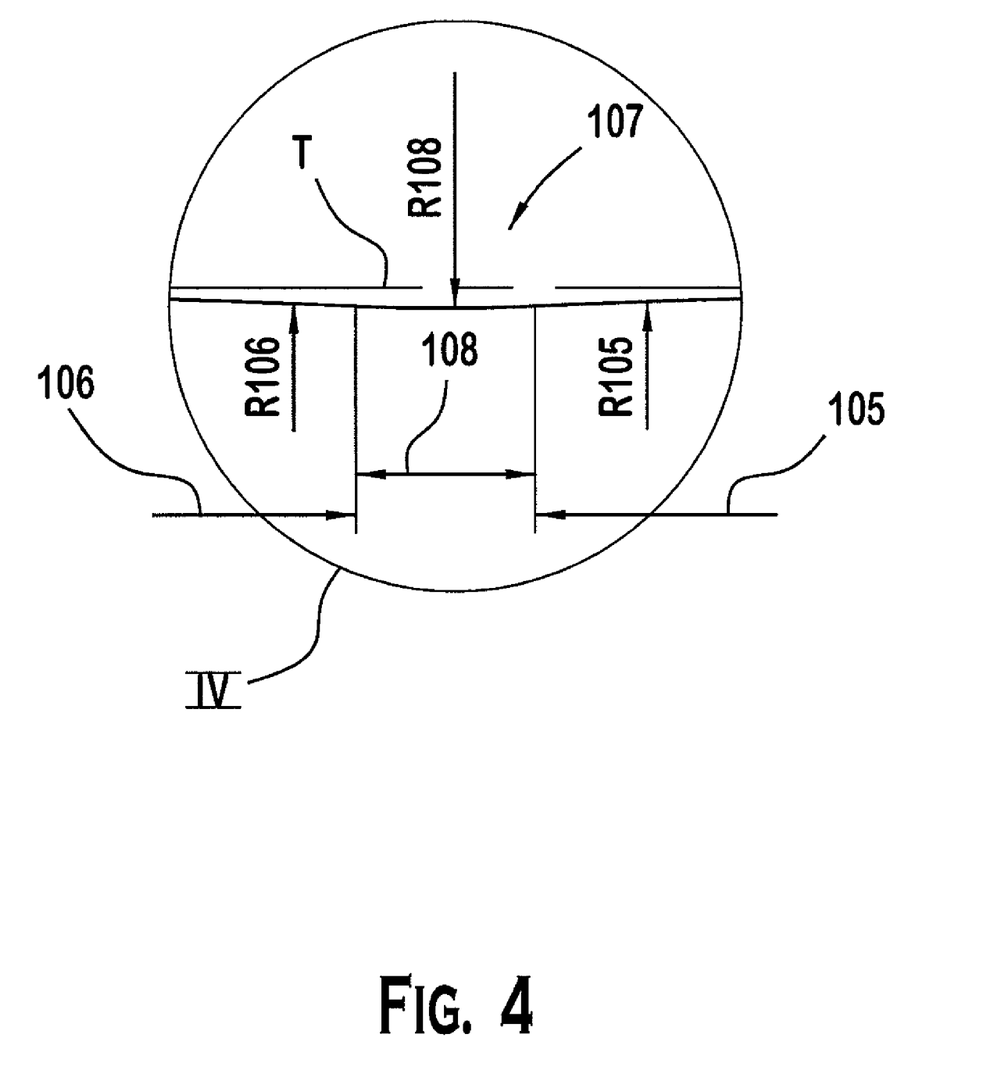
FIG. 4 is an enlarged view of a portion of the view in FIG. 3 marked by a circle designated IV.

FIG. 4 shows a portion of the wiping-edge segment 102, more precisely a portion of the depression 107. The first and the second convex segment parts 105, 106 are connected via a concave intermediate segment part, the extension of which is indicated in FIG. 4 by a double arrow 108, and which has a radius of curvature R108 that is considerably smaller than the same for the first and the second convex segment parts 105, 106. In this example, the radius of curvature R108 of the concave intermediate segment part 108 is 0.15 mm, while the radii of curvature T105, R106 of the two convex segment parts 105, 106 as mentioned are 5 mm. The first and the second, respectively, convex segment parts 105, 106 transform into the concave intermediate segment part 108 at a respective point of inflection, i.e., a point along the cutting edge where the slope of the curvature changes sign. In FIG. 4, the tangent line T is also shown at its distance from the cutting edge 10 at the deepest part of the depression 107.

Now, reference is made to FIG. 3. As has been mentioned above, with wiping-edge segment 102, in this description, reference is made to a segment of the cutting edge 10 that, in use, wipes off and levels the machined surface of the workpiece. Furthermore, with wiping-edge segment 102, in this description, in connection with embodiments where the first and second convex segment part 105, 106 have constant radii of curvature, reference is made to a segment of the cutting edge 10 that is limited by two imaginary limitation points A102, B102, the positions of which are determined by the following: The limitation points A102, B102 are on a respective side of the depression 107 where the curvature of the cutting edge 10 transforms from the radius of curvature R105, R106 of the first and the second, respectively, convex segment part 105, 106 into a respective curvature having another size. As is seen in FIG. 3, the limitation points A102, B102 are also limitations for the first and the second, respectively, convex segment part 105, 106. Thus, in the embodiment illustrated in FIGS. 1-8 and described here, the wiping-edge segment 102 is limited forward, as seen in the feeding direction A, that is, closest to the tip segment 103 of the cutting insert, by the point B102 where the convex segment part 105 meets the transition segment 104. Rearward from the feeding direction A, i.e., most spaced apart from the tip segment 103, the wiping-edge segment 102 is limited by the point A102 where the convex segment part 106 ends and transforms into an edge segment that is arranged to clear at a certain clearance angle from a machined surface of the workpiece.

In the example in FIGS. 3 and 4, the arc length of the first and the second convex segment parts is 0.26 mm and 0.6 mm, respectively, and the arc length of the intermediate segment part is 0.01 mm, which means that the length of the wiping-edge segment 102 is 0.87 mm.

In the example in FIG. 3, the end points of the first convex segment part 105 and the second convex segment part 106 are located along an imaginary substantially straight line. Alternatively, the end points of the first convex segment part 105 and the second convex segment part 106 may be situated along an imaginary curved line having a radius that is very great in comparison with the radii of curvature of the first and the second, respectively, convex segment parts 105, 106.

The length of the wiping-edge segment 102, the mutual lengths of the first and the second convex segment parts 105, 106, the respective radii of curvature of the first and the second convex segment parts 105, 106, as well as the projected center distance O56 may be varied in view of the size of the cutting insert, the feed speed, the type of machining to be carried out, as well as other parameters significant to the cutting insert. Furthermore, as mentioned, the radii of curvature of the first and the second convex segment parts 105, 106 may be equal or different. Preferably, the radii of curvature R105, R106 of each one of the first and the second convex segment parts 105, 106 are within the interval of 0.25-30 mm. The projected center distance O56 may be within the interval of 0.1-10 mm, and the length of the wiping-edge segment 102 may be within the interval of 0.2-25 mm. For the sake of clarity, it should be noted that with the length of the wiping-edge segment 102, reference is here made to the distance traveled when the cutting edge 10 is followed between the limitation points A102, B102 of the wiping-edge segment 102 (see FIG. 3). However, in most embodiments, this distance should be approximately as great as the shortest distance between the limitation points A102, B102.

Figure 5:
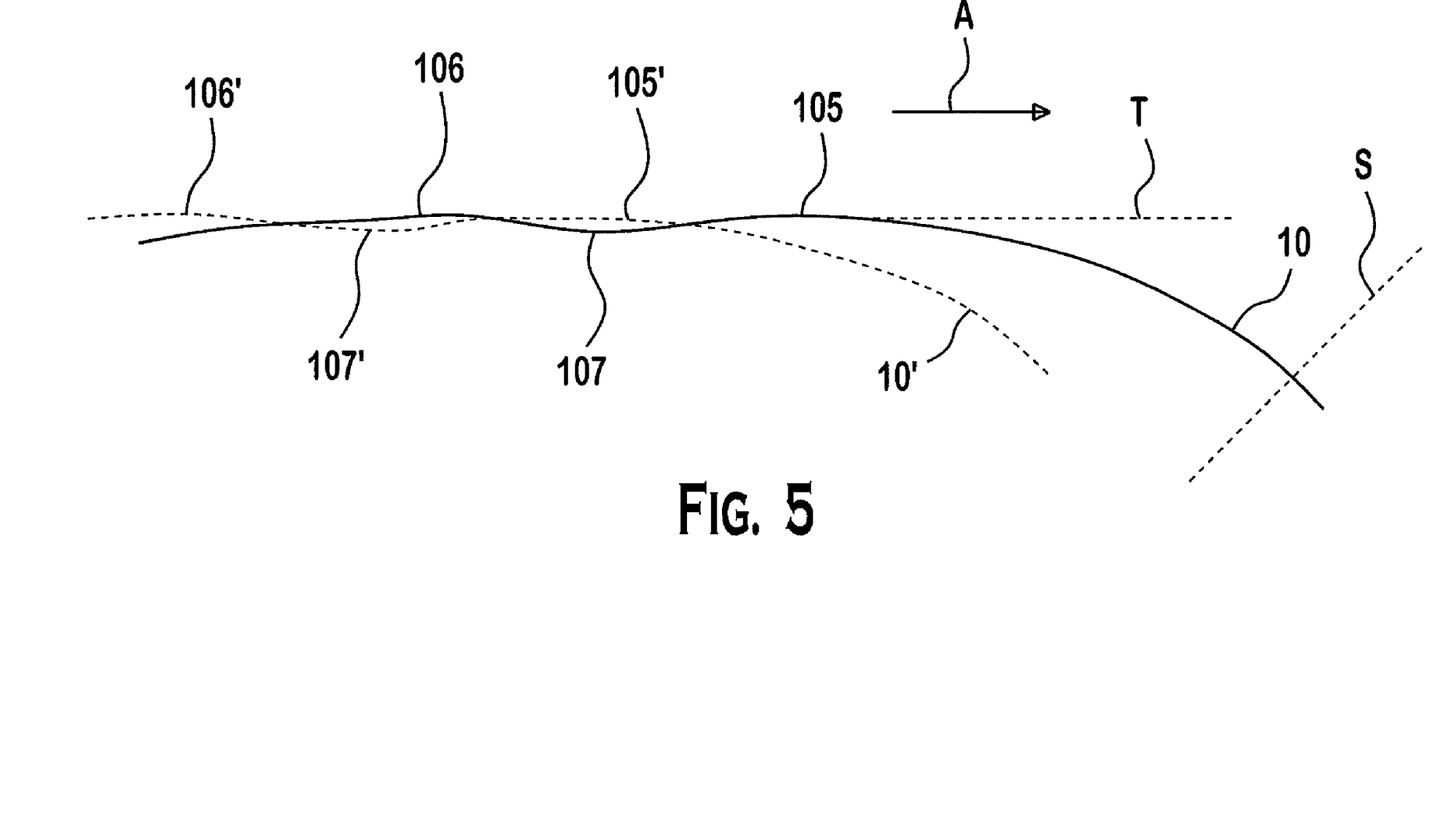
FIG. 5 is a schematic view of a part of the portion of the cutting edge in FIG. 3 in two different positions.

With reference to FIG. 5, it is here explained why, in comparison with prior art, a considerably improved surface finish of the machined workpiece is attained. In FIG. 5, a part of the cutting edge 10 is shown having the first and the second convex segment part 105, 106, as well as the depression 107 such as has been described above. Furthermore, by the broken line designated 10', the same part of the cutting edge in a previous position is shown, the workpiece having rotated one revolution from the previous position to the position shown by the solid line. In the previous position of the cutting edge 10', an elevation is left on the workpiece corresponding to the position of the depression 107'. By a feed speed that is suitably adapted to the projected center distance O56 (FIG. 3), in the next revolution of the workpiece, the second convex segment part 106 "sweeps" over the area where the depression 107' passed in the previous position, and thereby material that has been left by the depression 107' in the previous position is removed.

Figure 6:
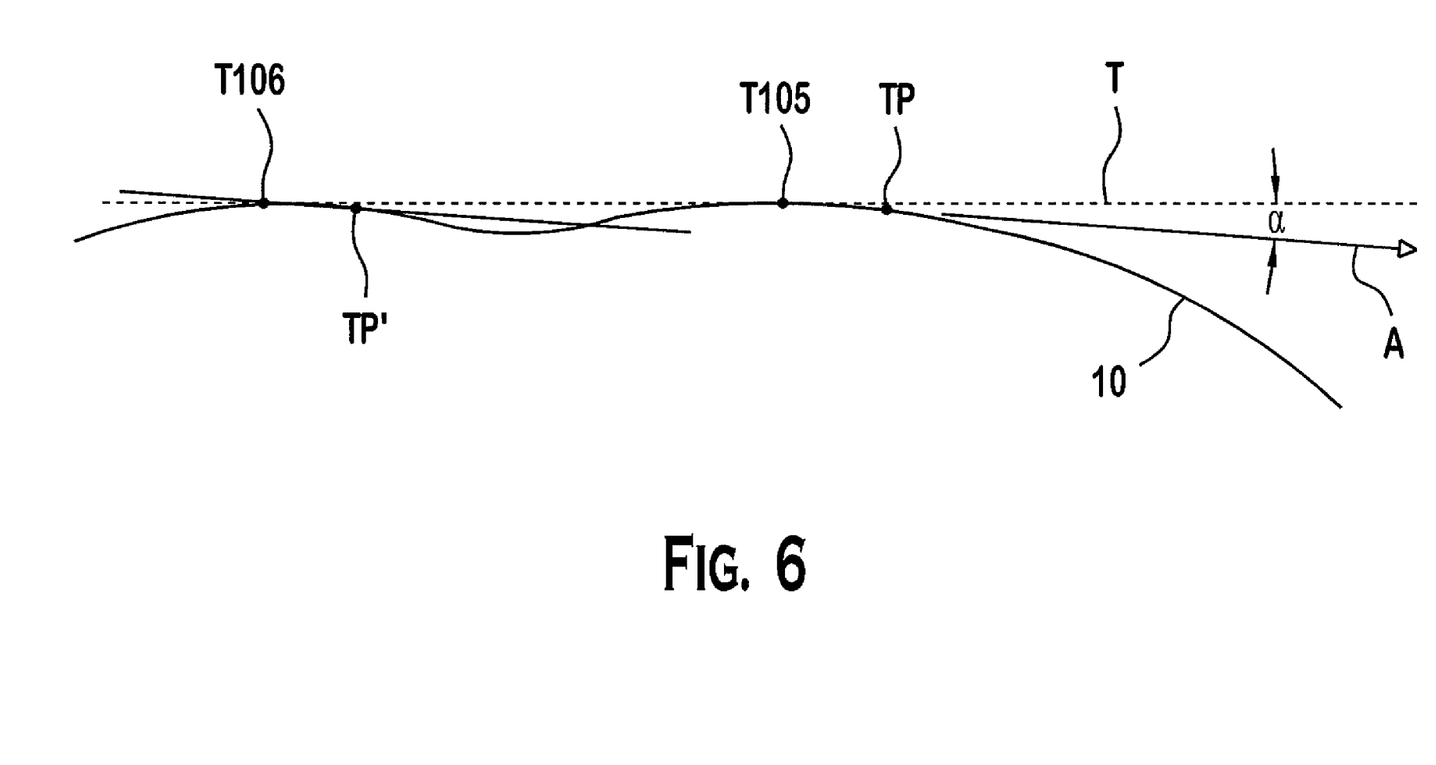
FIG. 6 is a schematic view of a part of the portion of the cutting edge in FIG. 3 in a somewhat inclined position.

Now, reference is made to FIG. 6. As mentioned, the tangential point is the point of the cutting edge that in use is closest to the rotation axis of the workpiece. As also has been indicated, in known cutting inserts that have wiping-edge segments having a large radius, a problem is created in the form of insufficient control of the position of the tangential point, because of misalignments of the cutting insert in relation to the feeding direction. By an embodiment of the invention, a wiping-edge segment may be provided having two convex segment parts 105, 106, which have, in relation to the length of the wiping-edge segment, relatively small radii. This means that the tangential point moves considerably less than in known solutions of the mentioned type for the corresponding size of the misalignment of the cutting insert in relation to the feeding direction. As is seen in FIG. 3, upon a correct alignment of the cutting insert, the vertex points T105, T106 are two tangential points. In FIG. 6, the cutting insert is misaligned so that the tangent line T, which is tangent to the first and the second convex segment parts 105, 106 at the vertex points T105, T106, forms an angle α with the feeding direction A. Thereby, a tangential point TP is formed, which is at a relatively small distance from the first vertex point T105. Thus, very good control of the position of the tangential point is attained.

Figure 7:
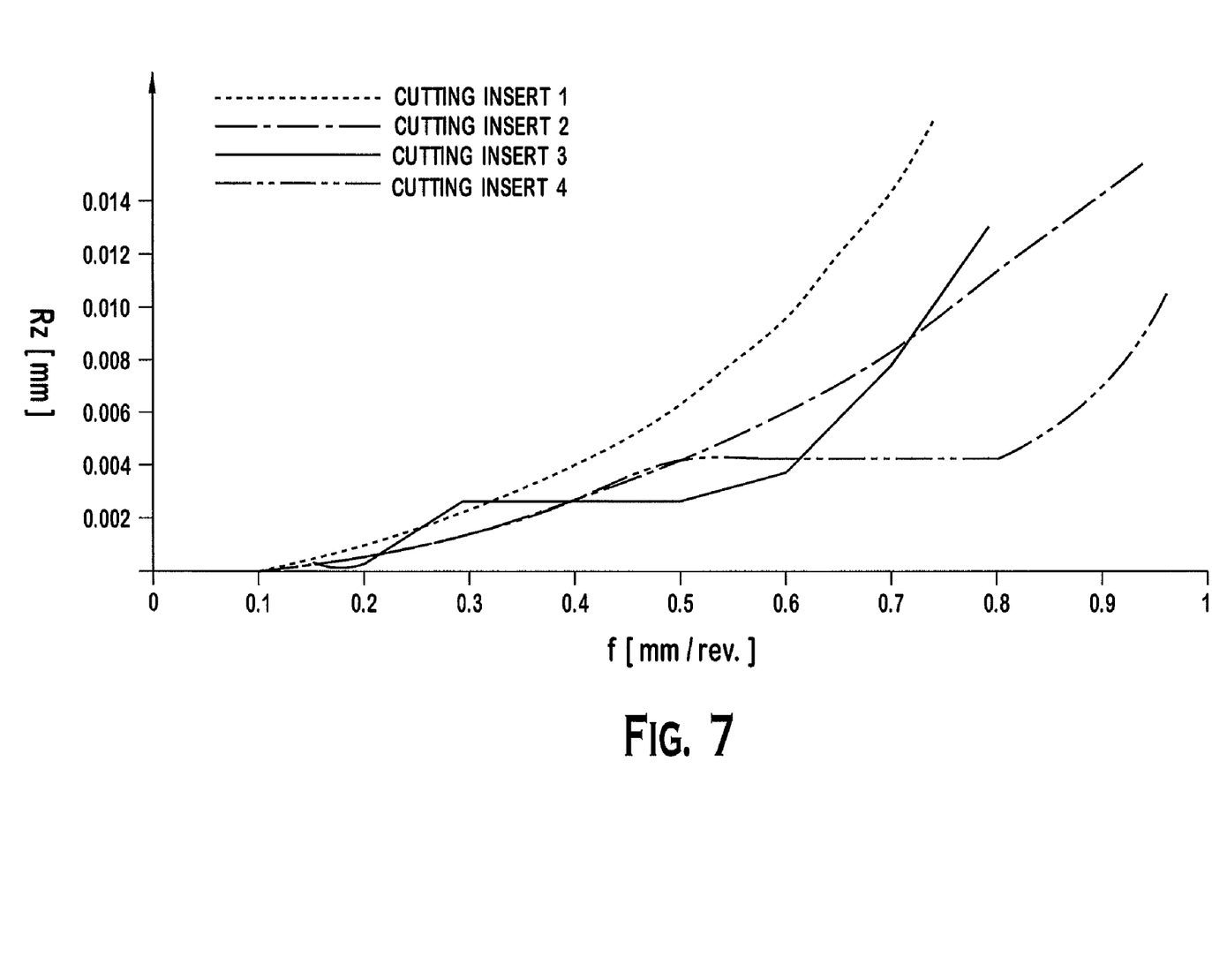
FIG. 7 is a diagram showing surface irregularity of a machined workpiece as a function of tool feed, for four different cutting inserts.

FIG. 7 shows results of theoretical calculations of the surface irregularity Rz of a machined workpiece, as a function of the feed f, for four different cutting inserts. Cutting insert 1 and cutting insert 2 are formed, according to prior art, with a wiping segment having a great constant radius. In cutting insert 1, the length of the wiping segment is 0.7 mm and the radius thereof is 5 mm, and in cutting insert 2, the length of the wiping segment is 1.1 mm and the radius thereof is 7.5 mm. Cutting insert 3 and cutting insert 4 are formed in accordance with embodiments of the invention. In cutting insert 3, the length of the wiping segment is 0.7 mm, the projected center distance is O56 (FIG. 3) 0.3 mm, and the radius of the first and the second convex segment parts 105, 106 (FIG. 3) is 5 mm and 3.5 mm, respectively. In cutting insert 4, the length of the wiping segment is 0.9 mm, the projected center distance O56 is 0.43 mm, and the radius of the first and the second convex segment parts 105, 106 is 7.5 mm and 3.5 mm, respectively.

As may be seen in FIG. 7, in the cutting inserts according to prior art, the surface irregularity, here measured in Rz, i.e., theoretical profile height of machined surface, increases continuously with the feed. However, in the cutting inserts formed according to embodiments of the invention, there occur intervals in the feed where the surface irregularity Rz is substantially constant. This very advantageous effect is a result of the "double" wiping operation, described with reference to FIG. 5, performed by the wiping-edge segment, in that the second convex segment part 106 "sweeps" over the area where the depression 107' passed in the preceding revolution.

Figure 8:
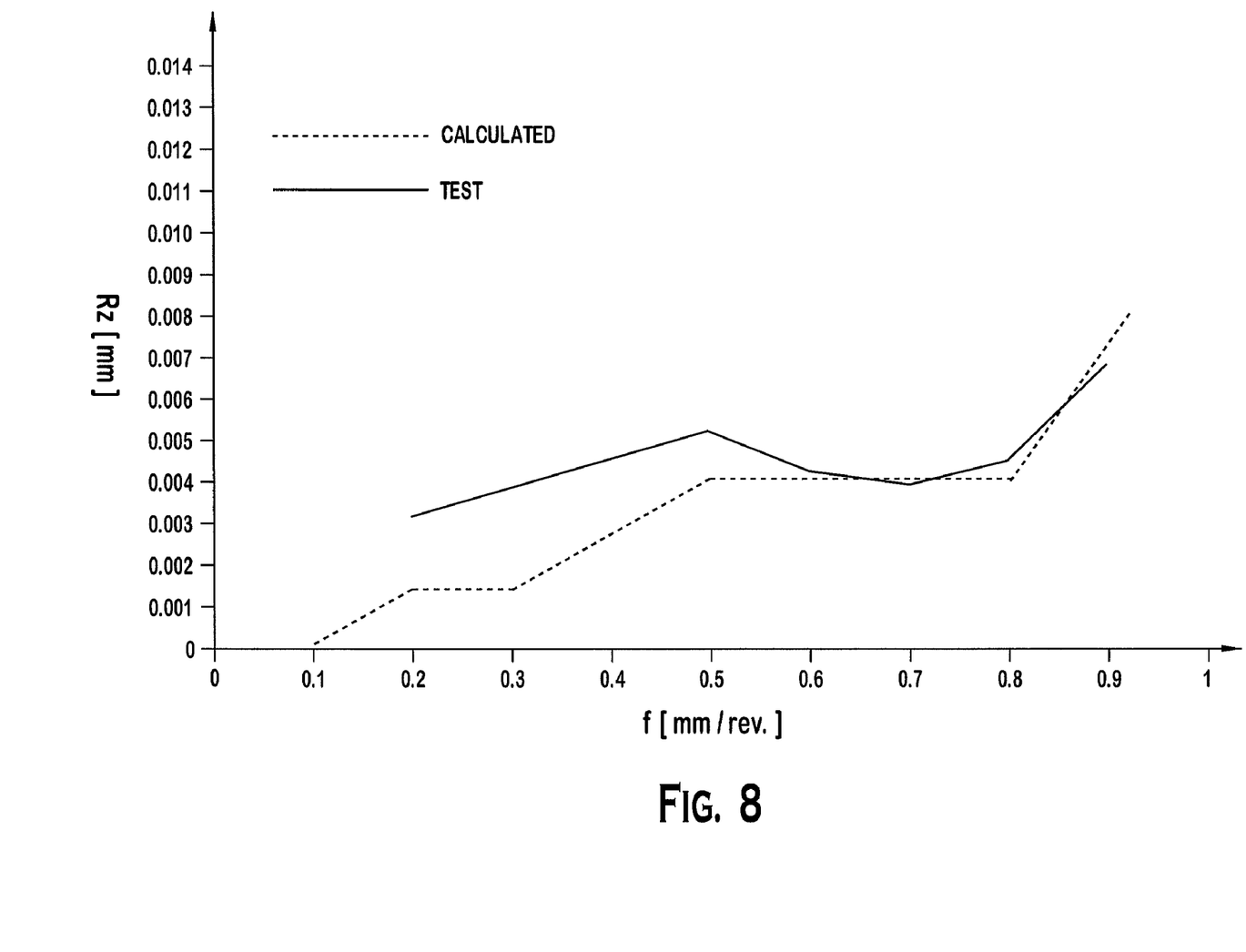
FIG. 8 is a diagram corresponding to the one shown in FIG. 7 with results from a test conducted.

Now, reference is made to FIG. 8. The broken line corresponds to the line for cutting insert 4 in FIG. 7. The solid line shows the surface irregularity Rz, as a function of the feed f, in a test conducted with a cutting insert that was identical with the cutting insert 4 in FIG. 7. The result confirms one of the great advantages of the invention in that there occurs, in the conducted test as well as in the calculation, an interval of the feed (from approx. 0.5 mm/r to approx. 0.8 mm/r) where the surface irregularity Rz does not increase with the feed.

A large number of alternative embodiments are within the scope of the instant invention. As an example, here it is mentioned that the wiping-edge segment 102 may form two or more depressions. In addition, as is exemplified in the embodiment illustrated in FIG. 9 and FIG. 10 and described below, one or more segment parts may have a radius of curvature that varies along their respective length.

Figure 9:
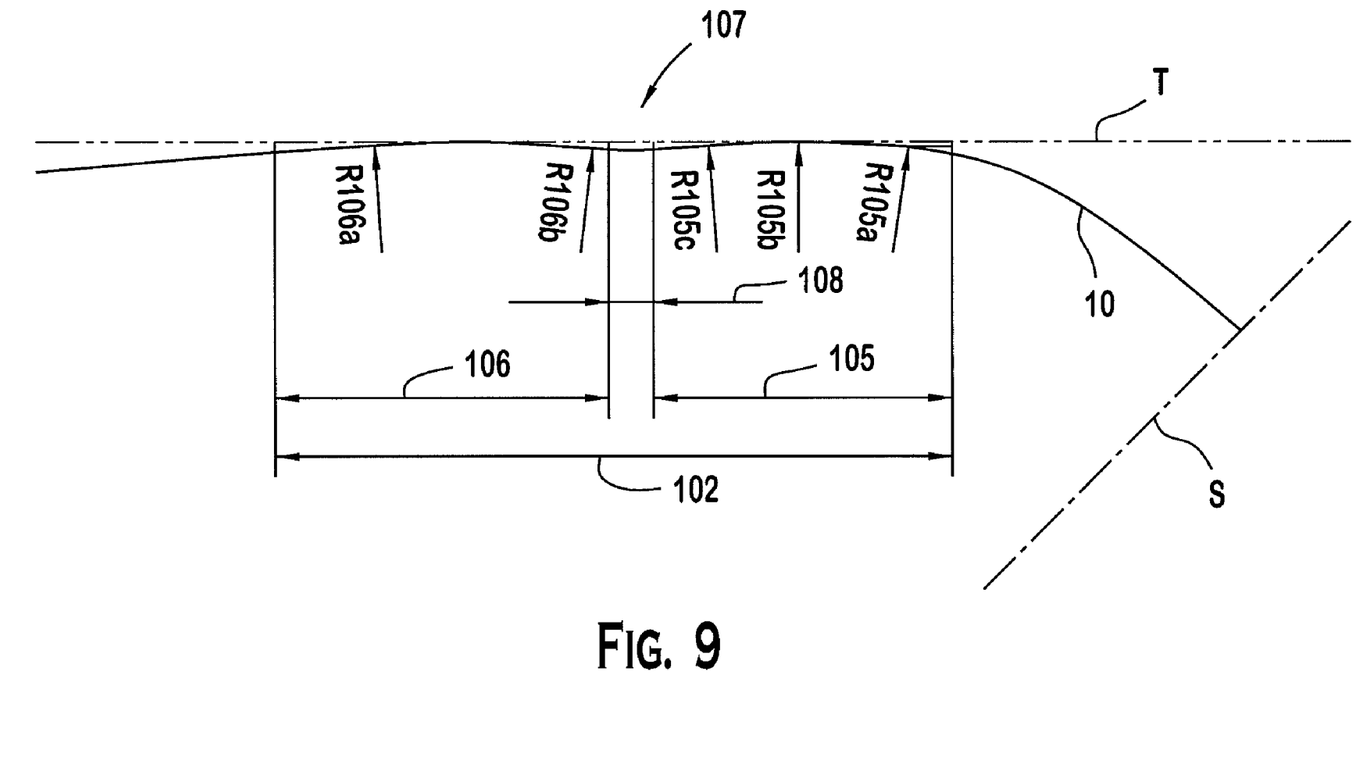
FIG. 9 is a view corresponding to the one shown in FIG. 3 of a portion of a cutting edge according to an alternative embodiment of the invention.

FIG. 9 shows a view corresponding to the one shown in FIG. 3 of a portion of a cutting edge 10. As in the embodiment described above, the cutting edge has a wiping-edge segment 102 forming a depression 107 between a first and a second convex segment part 105, 106. The convex segment parts have a respective radius of curvature that continuously increases in a direction toward a concave intermediate segment part 108 situated between the convex segment parts 105, 106. Thus, the first convex segment part 105 has a radius of curvature that, in the positions R105a, R105b, R105c indicated in FIG. 9, is 0.8 mm, 2.2 mm and 2.3 mm, respectively, and the second convex segment part 106 has a radius of curvature that, in the positions R106a, R106b indicated in FIG. 9, is 2.0 mm and 2.4 mm, respectively. Alternatively, one or both of the convex segment parts 105, 106 may have a radius of curvature that continuously increases in a direction away from the concave intermediate segment part 108.

Figure 10:
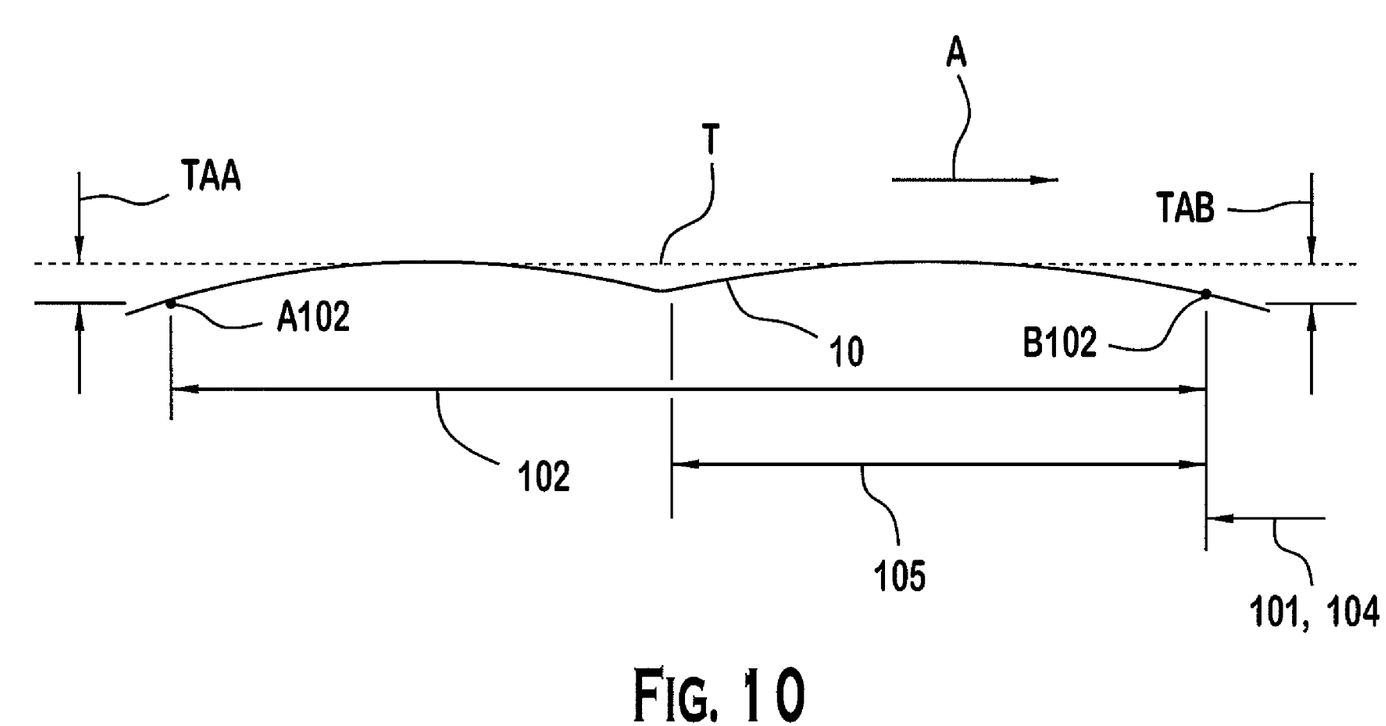
FIG. 10 is a schematic view of a part of the cutting-edge portion.

Now, reference is made to FIG. 10. As has been mentioned above, with wiping segment 102, reference is made to a segment of the cutting edge 10 that, in use, wipes off and levels the machined surface of the workpiece. In connection with embodiments, e.g., such as described with reference to FIG. 9 and FIG. 10, where one or both of the convex segment parts 105, 106 have a non-constant radius of curvature, with wiping-edge segment 102 according to this description, reference is made to a segment of the cutting edge 10 that is limited by two imaginary limitation points A102, B102, the positions of which are determined by being located at a certain perpendicular distance TAA, TAB from the tangent line T. In the embodiment described here, reference being made to FIG. 9 and FIG. 10, the distances TAA, TAB are both 0.01 mm. However, the distances TAA, TAB may be chosen depending on the intended application of the cutting insert, and may accordingly be greater as well as smaller than 0.01 mm.

The curvature of the cutting edge at the wiping-edge segment 102 may be determined in a number of alternative ways, e.g., by one or more so-called splines, which are found in drawings within other fields, such as vehicles, airplanes and ships.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A cutting insert for chip removing machining of workpieces, comprising:
    at least one chip-removal surface that carries away chips;
    at least one side surface that is a clearance surface; and
    at least one cutting edge formed between the at least one chip-removal surface and the at least one side surface, the cutting edge including a main-edge segment that carries out a major part of a chip-removing operation, and a wiping-edge segment that, in the chip-removing operation, wipes off and levels a machined surface of the workpiece,
    wherein the wiping-edge segment forms a depression, and
    wherein the wiping-edge segment includes first and second convex segment parts, the depression being formed between the convex segment parts.

2. The cutting insert according to claim 1, wherein the depression is orientated principally in a plane parallel to a principal extension area of the chip-removal surface at which the depression is formed.

3. The cutting insert according to claim 1, wherein the greatest depth of the depression is at least 0.2% of a length of the wiping-edge segment.

4. The cutting insert according to claim 3, wherein the greatest depth of the depression is at least 0.002 mm.

5. The cutting insert according to claim 1, wherein the depression is limited by an imaginary straight tangent line, which is tangent to the first and the second convex segment parts at respective first and second vertex points of the first and second convex segment parts, and by the cutting edge between the first and the second vertex points.

6. The cutting insert according to claim 5, arranged to, in use, be fed parallel to the imaginary straight tangent line that is tangent to the first and the second convex segment parts.

7. The cutting insert according to claim 5, wherein the first and the second convex segment parts have a substantially constant radius of curvature with respective first and second centers of curvature that are situated separated from each other and in the same order, as seen parallel to a feeding direction for the cutting insert, as the first and the second convex segment parts.

8. The cutting insert according to claim 7, wherein the distance, as seen parallel to the feeding direction for the cutting insert, between the first and the second centers of curvature is smaller than the length of the wiping-edge segment.

9. The cutting insert according to claim 8, wherein the distance, as seen parallel to the feeding direction for the cutting insert, between the first and the second centers of curvature is within the interval of 0.1-10 mm.

10. The cutting insert according to claim 1, wherein the first and the second convex segment parts respectively have first and second radii of curvature which are at least 100% of the length of the wiping-edge segment.

11. The cutting insert according to claim 10, wherein the first and the second convex segment parts respectively have first and second radii of curvature within the interval of 0.25-30 mm.

12. The cutting insert according to claim 1, wherein the first convex segment part is situated in front of the second convex segment part, as seen parallel to a feeding direction for the cutting insert, and has a radius of curvature that is greater than a radius of curvature of the second convex segment part.

13. The cutting insert according to claim 1, wherein at least one of the first and the second convex segment parts has a radius of curvature that varies along the at least one of the first and the second convex segment parts.

14. The cutting insert according to claim 13, wherein the at least one of the first and the second convex segment parts has a radius of curvature that continuously is changed along the at least one of the first and the second convex segment parts.

15. The cutting insert according to claim 13, wherein the radius of curvature of the at least one of the first and the second convex segment part increases in a direction toward the second convex segment part.

16. The cutting insert according to claim 13, wherein the wiping-edge segment is limited by two imaginary limitation points, situated on respective sides of the depression, the positions of which are determined by being at a predetermined perpendicular distance from an imaginary straight tangent line that is tangent to the first and the second convex segment parts.

17. The cutting insert according to claim 16, wherein the predetermined perpendicular distance from the imaginary straight tangent line is 0.01 mm.

18. The cutting insert according to claim 1, wherein the length of the wiping-edge segment is at least 0.2 mm.

19. The cutting insert according to claim 1, wherein the length of the wiping-edge segment is at most 25 mm.

* * * * *